United States Patent
Bruant et al.

(10) Patent No.: US 7,311,128 B2
(45) Date of Patent: Dec. 25, 2007

(54) TREAD HAVING TREAD PATTERN ELEMENTS FORMED OF AT LEAST TWO RUBBER MIXES

(75) Inventors: Rémi Bruant, Riom (FR); Didier Vasseur, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 204 days.

(21) Appl. No.: 10/965,916

(22) Filed: Oct. 18, 2004

(65) Prior Publication Data

US 2005/0109436 A1    May 26, 2005

Related U.S. Application Data

(63) Continuation of application No. PCT/EP03/04116, filed on Apr. 22, 2003.

(30) Foreign Application Priority Data

Apr. 19, 2002  (FR) .................................. 02 05103

(51) Int. Cl.
*B60C 1/00*      (2006.01)
*B60C 11/00*     (2006.01)

(52) U.S. Cl. ................................ 152/209.5; 152/209.8; 152/209.18

(58) Field of Classification Search ............. 152/209.5, 152/209.18, 209.8
See application file for complete search history.

(56) References Cited

U.S. PATENT DOCUMENTS

| | | | |
|---|---|---|---|
| 3,364,965 A | 1/1968 | Oubridge | |
| 4,619,300 A | 10/1986 | Ikeda et al. | |
| 5,840,137 A | 11/1998 | Futamura | |
| 6,213,181 B1 * | 4/2001 | Janajreh | 152/209.5 |
| 6,247,512 B1 | 6/2001 | Radulescu | |
| 6,474,382 B1 * | 11/2002 | Finck | 152/209.5 |
| 6,561,244 B2 * | 5/2003 | Zanzig et al. | 152/209.5 |

FOREIGN PATENT DOCUMENTS

| | | |
|---|---|---|
| DE | 3610662 | * 10/1987 |
| DE | 197 31 525 | 7/1998 |
| EP | 0 105 822 | 6/1988 |

(Continued)

OTHER PUBLICATIONS

Clark, Mechanics of Pneumatic Tires, pp. 21-29, Aug. 1981.*

(Continued)

*Primary Examiner*—Steven D. Maki
(74) *Attorney, Agent, or Firm*—Buchanan Ingersoll & Rooney PC

(57) ABSTRACT

A tire tread includes a plurality of elements in relief (rib and/or block) having lateral faces, and a contact face intended to come into contact with the roadway during travel. The intersection of each lateral face with the contact face forms a ridge. The tread also includes a plurality of cutouts each defined by opposing main faces. Each tread pattern element is formed with at least one base mix. As viewed in section in a plane containing the thickness of this tread, at least one face defining at least one cutout is formed at least in part with a covering mix. The base mix exhibits a gripping action on wet ground which is lower than a gripping action of the covering mix on the same ground.

9 Claims, 3 Drawing Sheets

FOREIGN PATENT DOCUMENTS

| | | | |
|---|---|---|---|
| EP | 780245 | * | 6/1997 |
| EP | 864446 | * | 9/1998 |
| EP | 1 008 466 | | 6/2000 |
| FR | 2 005 522 | | 12/1969 |
| GB | 1124915 | * | 8/1968 |
| JP | 55-106803 | * | 8/1980 |
| JP | 2-246808 | * | 10/1990 |
| JP | 2001-287509 | * | 10/2001 |

OTHER PUBLICATIONS

K. Suganuma et al.: Joining of Silicon Nitride to Molybdenum Under High Pressure; 6001 Chemical Abstracts 110 (Jan. 1989) No. 4, Columbus, Ohio.

* cited by examiner

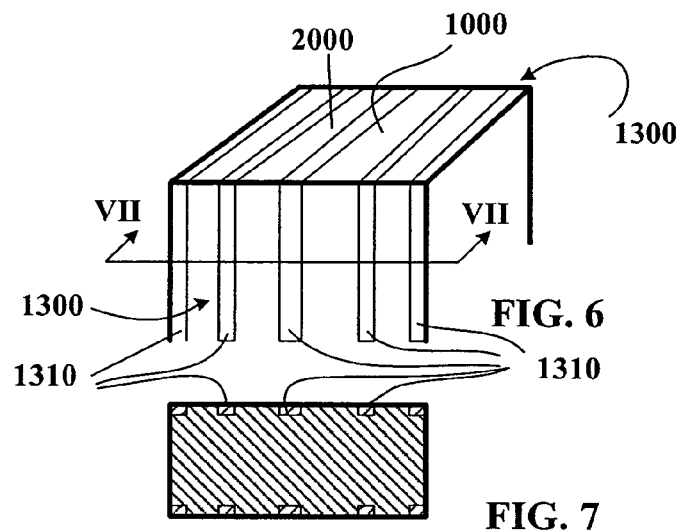
FIG. 6
FIG. 7
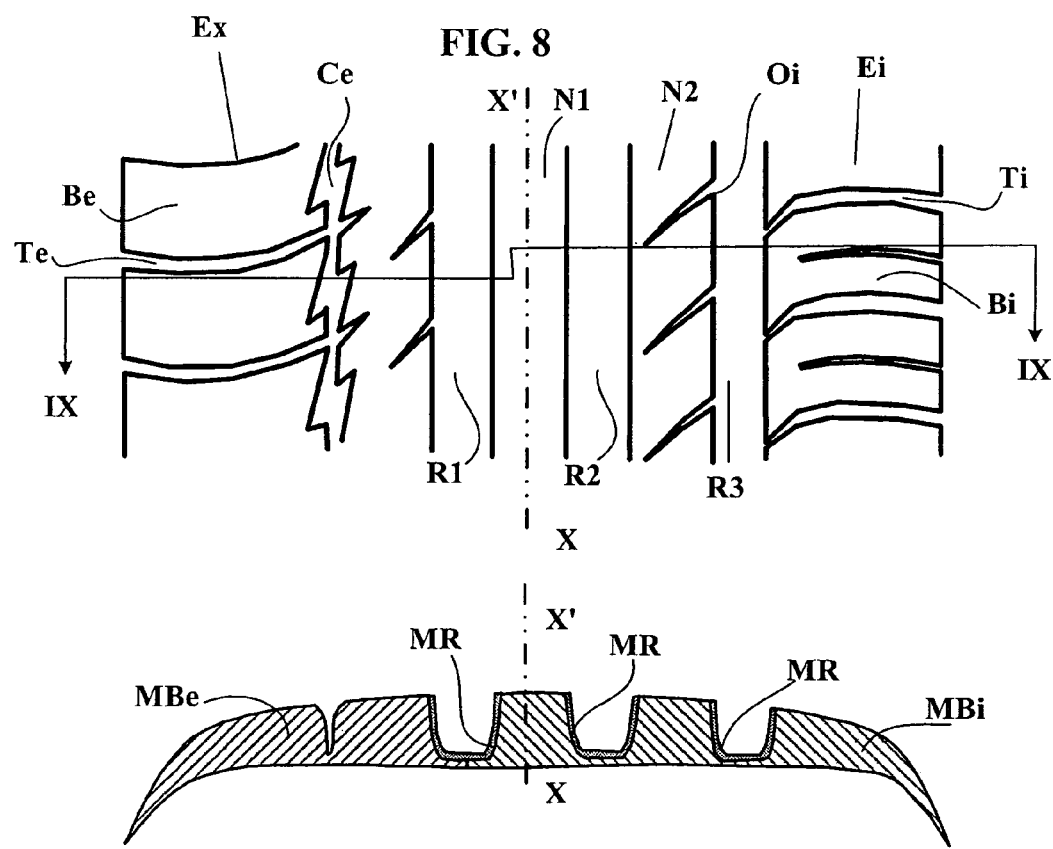
FIG. 8
FIG. 9

TREAD HAVING TREAD PATTERN ELEMENTS FORMED OF AT LEAST TWO RUBBER MIXES

This application is a continuation of International Application PCT/EP03/04116 filed on Apr. 22, 2003, and which published under WO 03/089257 on Oct. 30, 2003.

FIELD OF INVENTION

The invention relates to tires and more particularly to the treads of such tires.

BACKGROUND OF INVENTION

In order to obtain satisfactory performance during travel in particular on a wet road, it is known to provide a tread of a tire with a tread pattern formed by tread pattern elements which are separated from each other by cutouts (grooves of average width greater than or equal to 2.5 mm and incisions of average width less than 2.5 mm), these cutouts being obtained for example by molding. The tread pattern elements thus formed comprise a contact face intended to come into contact with the roadway during travel and lateral faces also defining the cutouts; the intersection of each lateral face with the contact face forms a ridge which facilitates the contact of the tire with the roadway, and in particular when the latter is wet. More generally, a ridge is defined as the geometric limit of contact of a tread pattern element with the ground during travel.

Among tread pattern elements, a distinction is made between elements which do not run right around the tire (blocks) and elements which do run right around it (ribs). Furthermore, the tread pattern elements may comprise one or more incisions to form additional ridges, when each incision may or may not open on to at least one lateral face of the tread pattern element. By definition, an incision is the space defined by two main opposing faces distant from each other by a width of less than 2.5 mm.

In improving the grip of the tire on a damp road, it is known that the very nature of the rubber mix (alternatively referred to as "rubber composition") forming the tread has a significant effect. Thus, a tread of a tire made of rubber mix having a better grip on wet ground makes it possible to obtain improved performance during travel in wet ground conditions. However, in parallel to this improvement in grip performance on wet ground, a loss of wear performance on a dry road occurs, which results in a reduced wear life and necessitates more frequent changing of the tires on a vehicle.

Consequently, there is a need for a tire the tread of which retains good wear life performance while substantially improving the grip performance on wet ground.

SUMMARY OF THE INVENTION

To this end, there is proposed a rubber tread comprising:
- a plurality of elements in relief (rib and/or block) comprising a contact face intended to come into contact with the roadway during travel of a tire provided with said tread and lateral faces, the intersection of each lateral face with the contact face forming a ridge,
- a plurality of cutouts in the form of grooves and/or incisions, said cutouts being defined by opposing lateral faces, each tread pattern element being formed mainly with at least one first rubber mix (referred to as "base mix"), this tread being characterized in that, viewed in section in a plane containing the thickness of this tread, at least one face of height H defining at least one cutout is covered at least in part with a second rubber mix, referred to as "covering mix", this part consisting of covering mix extending over a height Hr at least equal to 30% of the height H of the face, at least one base mix opens on to the contact face when new or at the latest after wear at most equal to 10% of the height Hr, the thickness of each covering mix on each covered lateral face being at most equal to 50% of the average distance D between said lateral face and the lateral face of the same rubber element which it defines and which is closest thereto, the base mix having a grip on wet ground which is lower than the grip of the covering mix on the same ground.

The grip on wet ground of each mix may be obtained under various conditions, in particular by producing tires having treads of a single rubber mix and evaluating the grip characteristics of several mixes on a wet circuit. It is also possible to use the conditions of the test defined in accordance with Standard NF P18-578.

Preferably, and in order to have a perceptible effect on the new tire, the covering mix of at least one face is arranged starting from the contact face when new.

Preferably, the thickness of covering mix is greater than 0.2 mm over at least 80% of the height Hr. Preferably, the thickness of covering mix is at least equal to 0.2 mm and at most equal to 3 mm, over at least 80% of the height Hr, and even more advantageously of between 0.4 mm and 2 mm, over at least 80% of the height Hr.

"Average distance between one lateral face covered by a covering mix and another lateral face of the same element" is understood to mean the average distance, measured perpendicular to the lateral face in question, between this face and the lateral face defining with it a rubber element having at least these two faces as lateral faces.

"Average thickness of covering mix on a face" is understood to mean the average of the maximum and minimum thicknesses of covering mix, it being understood that these thicknesses are measured on the tire in the initial state perpendicular to the face in question.

"Average distance between a cutout (groove, incision) in question and its closest cutout which is substantially parallel thereto" is understood to mean the average of the maximum and minimum distances between said cutouts.

Preferably, the covering mix adheres at least 5% better on wet ground than the base mix and even more preferably adheres at least 10% better on wet ground than the base mix, in particular under the conditions of the test defined in accordance with Standard NF P18-578.

The tire according to the invention surprisingly makes it possible to obtain a good balance between the wear performance on dry ground and the grip performance on wet ground, because although it was known, in order to obtain a tire of high performance on snow-covered ground, to form elements in relief in a first base mix and to cover the lateral faces of these elements with a layer of low thickness in a mix having an average glass transition temperature (Tg) less than that of the base mix (see for example U.S. Pat. No. 5,840,137), no document described or suggested the proposed solution according to which the covering mix has a grip on wet ground which is better than that of the base mix. As far as the grip of a mix on wet ground is concerned, reference may be made to the following document: "Rubber friction on self-affine road tracks" paper 43, American Chemical Society, Rubber division meeting, Chicago Apr. 13-16, 1999. This document clearly states that there is a relationship between the hysteresis of a mix and its grip performance on wet ground. One way of increasing the grip on wet ground of a rubber mix is to increase its hysteresis by selecting for example a mix having a higher glass transition temperature Tg.

For each rubber mix, the grip characteristics on wet ground are evaluated in accordance with the provisions laid down by Standard NF P18-578 for characterizing a type of ground or a roadway using a portable device called "British Pendulum Tester", sold by Stanley Corporation. According to this standard, a roadway surface is characterized by its level of grip in wet conditions, this being measured with the above device using a mix referred to as "reference mix" defined in the same Standard NF P18-578 and also sold by Stanley Corporation.

This standard was used here to evaluate the relative levels of grip of the various rubber mixes used. The measurements are carried out at a temperature of approximately 25° C. The roadway on which the evaluations of said levels of grip in wet conditions are carried out is a real roadway the "true sand patch depth" (TSPD) of which as defined by Standard NF P 98-216-1 is of between 0.4 and 1.5 mm. To establish satisfactory characterization of each rubber mix, it is advisable to use a real roadway (corresponding to the roadway on which a vehicle is caused to travel) rather than any type of abrasive track; preferably, the grip is characterized on a roadway identical to the one on which the running tests with vehicle are performed.

It was mentioned further above that one method of improving the grip performance of a mix on wet ground of a rubber composition may be obtained by increasing the Tg of said composition. This method consists, for example and as is known, of modifying the nature of the polymer and in particular the microstructure thereof (in particular in the case of an SBR by appropriately adjusting either the amount of styrene or the amount of vinyl or both). Preferably, the difference in Tg between the base mix and the covering mix is at least 5° C.

Furthermore, there is another method according to which, at the same Tg, two mixes may have different grip performances on wet ground. This second method consists, for example, of:
  replacing all or part of the carbon black filler with a reinforcing inorganic filler (and in particular a highly dispersible silica);
  increasing the amount of filler (preferably that of the reinforcing inorganic filler).

Of course, a combination of the aforementioned methods is entirely conceivable.

The covering material having greater grip than the base mix may be arranged on the opposing faces defining one and the same cutout, whether or not covering the bottom of the cutout.

Advantageously, all the lateral faces of the elements in relief defining circumferential grooves are provided with a covering mix of grip on wet ground which is greater than the grip of the base mix in order to improve very substantially the cornering performance (under transverse stresses) on wet ground. Of course, different covering mixes may be used in combination with a base mix (or even several base mixes); in this case, each covering mix has a grip on wet ground which is better than that of the base mix which is directly adjacent thereto. Advantageously, the elements in relief located towards the inside of a vehicle on which is mounted the tire provided with the tread according to the invention may comprise an internal covering mix and the elements towards the outside may comprise an external covering mix, these covering mixes being of different grip characteristics, the greater grip being, for example, located to the inside relative to the equatorial plane of the tire in order to produce a better compromise between the grip on a dry road and the grip on a damp road.

It is known that for various reasons, and in particular owing to the change in properties of the material with use and over time, the level of grip of the tire on wet ground may decrease gradually, even when the material is initially homogeneous within the thickness of the tread. In order to overcome this disadvantage, it is advantageous, in combination with the provisions of the invention, to provide for the presence of a second base mix which adheres better on wet ground than the first base mix and the arrangement of which within the elements is such that this second mix appears gradually over the width on the contact face of said elements, or more generally appears gradually over the width of the running surface of the tread as this tread becomes worn. According to an advantageous variant, the second mix may be identical to the covering mix.

Preferably, it was determined that the base mix had to have a loss factor greater than 0.20 for a peak-to-peak shearing deformation of 2%. The loss factor is equal to the loss modulus of the material divided by the elasticity modulus of the material, these moduli being measured in accordance with Standard ASTM D 2231-71 at a temperature of 23° C. and at a frequency of 10 Hz. This loss factor is commonly referred to as: tan delta (tan$\delta$). Even more preferably, the loss factors of the base mix(es) are greater than 0.23 under the same conditions (which corresponds substantially to a value of tan delta greater than 0.20 at 70° C).

BRIEF DESCRIPTION OF THE DRAWINGS

Other characteristics and advantages of the present invention will become apparent from the description given hereafter with reference to the appended drawings, in which:

FIG. 6 shows a perspective view of a variant of a tread pattern block according to the invention in the initial state;

FIG. 7 shows a section along a plane VII-VII parallel to the contact face of the block shown in FIG. 6;

FIG. 8 represents a tread pattern according to the invention, the results for which will be set forth below;

FIG. 9 shows a cross-section along the line IX-IX of the tread of FIG. 8;

DESCRIPTION OF THE PREFERRED EMBODIMENTS

Figure 1:
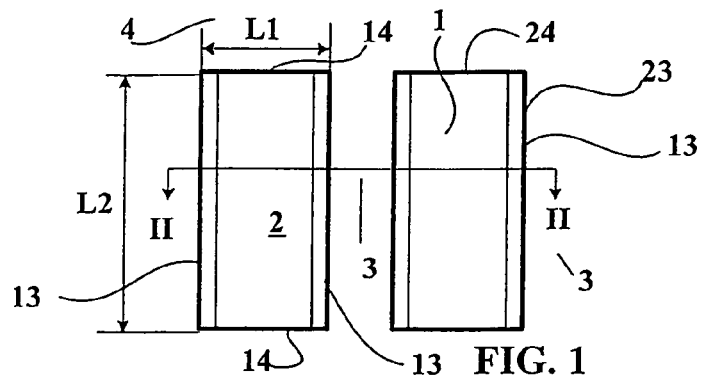
FIG. 1 represents a partial plan view of a block tread pattern of a tread.

In FIG. 1, there can be seen the contact faces 2 of two blocks 1 of a tread pattern according to the invention. Each of these blocks 1 comprises four lateral faces 13 and 14 defined respectively by grooves of longitudinal 3 and transverse 4 orientation. The intersections of the lateral faces of each block with its contact face 2 form ridges 23, 24 which play an important part during travel and in particular on a wet road. Each block 1 is rectangular, of width L1 and of length L2 (the direction of the length L1 of the blocks in the case described being the same as the longitudinal direction of the tread or alternatively the circumferential direction on the tire provided with said tread.

Figure 2:
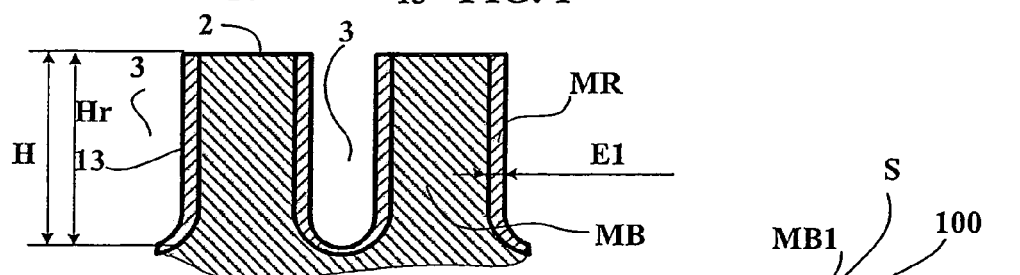
FIG. 2 shows the blocks of FIG. 1 in cross-section along the section line II-II.

On the cross-section shown in FIG. 2 and taken along the line 11-11 of FIG. 1 and perpendicular to the contact faces 2 of the blocks 1, it can be seen that the faces or lateral faces 13 defining the grooves of longitudinal orientation 3 are covered with a substantially constant thickness E1 of a covering rubber mix MR which is different from the rubber mix MB (referred to hereafter as base mix) in that it has properties of grip on wet ground which are better than those of the base mix on the same ground and under the same conditions. The average thickness E1 of coating mix MR of the lateral faces is less than half the total width L1 of the blocks and preferably less than 30% of L1. In order to obtain a significant and durable effect, it is preferable for this average thickness to be at least equal to 0.2 mm in the case of a tread pattern intended for a tread of a passenger-vehicle tire. It can be seen that the covering mix MR is also present at the bottom of the grooves 3.

The thickness E1 of coating mix MR may, as is the case here, be substantially uniform over the entire height of the face H and between 0.2 mm and 3 mm, and even more preferably between 0.4 mm and 2 mm for a passenger-car tire.

The example described with the presence of a mix which adheres better on only two of the faces of the blocks may be easily extended to the other two faces or alternatively to all the lateral faces. It may furthermore be advantageous to arrange separate mixes according to the faces or lateral faces covered (likewise, the average thicknesses may be different according to the face in question).

Figure 5:
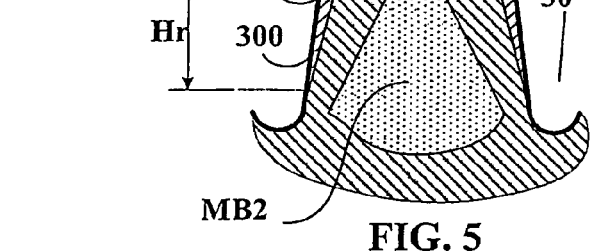
FIG. 5 shows in cross-section a variant of a tread pattern block according to the invention.

In another advantageous variant, the thickness of covering mix may vary in the direction of the depth of the grooves (this is for example the case with the variant shown in FIG. 5). The average thickness of covering mix is the average of the maximum and minimum thicknesses, these thicknesses being measured perpendicular to the face in question. In the case of a variation in thickness, the deviation between the maximum thickness and the minimum thickness is at most equal to two times the average thickness. Preferably, the maximum thickness is closer to the contact face of the elements in relief in the initial state (corresponding to the new tire).

Figure 3:
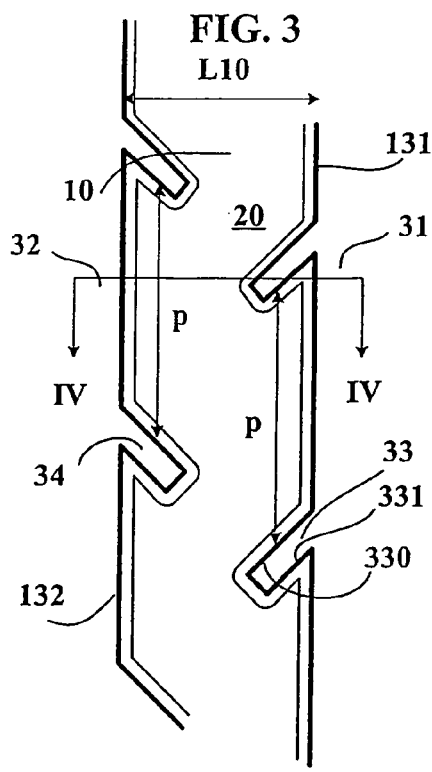
FIG. 3 shows a partial plan view of a rib tread pattern running right around the tire.

FIG. 3 shows a plan view of the contact face 20 of width L10 of a rib 10 of a tread defined by two grooves of circumferential or longitudinal orientation 31 and 32. This rib 10 is provided with a plurality of incisions 33, 34 opening alternately on to a single one of the lateral faces 131, 132. These incisions are inclined relative to the longitudinal direction by an angle substantially equal to 45°. These incisions 33, 34 have substantially the same depth as the grooves defining the rib. The average pitch P between these incisions is substantially the same for both series of incisions. The rib 10 is formed in a base mix MB and covered on these lateral faces with a covering mix MR having a grip on wet ground which is greater than that of the base mix.

Figure 4:
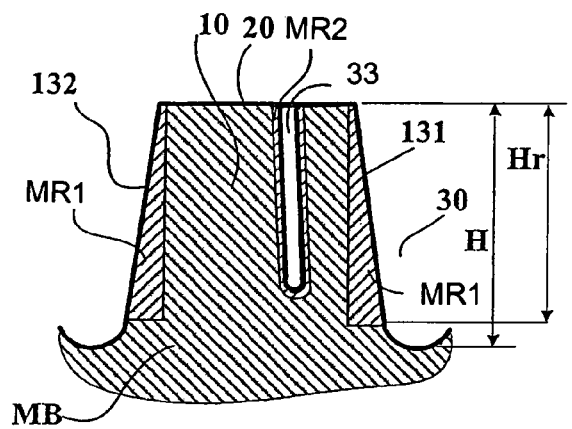
FIG. 4 shows the cross-section along the section line IV-IV of the rib shown in FIG. 3 in the initial state.

In FIG. 4, which represents a section in a plane perpendicular to the contact face 20 and the trace of which is marked by the line IV-IV in FIG. 3, there can be made out on the lateral faces 131, 132 of the rib 10 and on the opposing faces 330 and 331 defining each incision 33 the presence of covering mixes MR1 and MR2 respectively, the thicknesses of which increase with the depth whatever the face in question (hence the durability of the grip performance is reinforced still further). These average thicknesses here are less than 30% of the minimum of the two values L10 (average width of the rib) and the pitch P between the incisions 33 and 34. In this variant, it can be seen that the covering mix MR1 also covers the opposing faces 330, 331 defining the incision 33.

One way of obtaining such a rib consists for example of covering a tread blank made of a base mix with a layer of covering mix of appropriate thickness before molding the tread and the grooves and the incisions. After molding, the covering mix on the contact face of the rib may be removed by mechanical means (in particular by grinding). This means is also applicable to the blocks shown in FIGS. 1 and 2.

FIG. 5 shows, in section, a variant of an element in relief 100 of a tread according to the invention for which, in addition to the covering mix MR provided on the lateral faces 300 of said element, provision is made within the element for the presence of a first base mix MB1 and a second base mix MB2. This second base mix MB2 is in the form of a triangle, one apex S1 of which is close to the running surface in the initial state (without for all that opening on to said surface when new). This second base mix MB2 is selected to have grip characteristics which are intermediate between the first base mix MB1 and the covering mix MR. As the tread becomes worn, this second base mix MB2 gradually appears on the new contact face and its level of grip which is greater than that of the first base mix makes it possible to maintain the level of grip of the tire despite the wear. It can also be seen on this variant that the covering mix MR has a maximum thickness close to the contact surface in the initial state and that this thickness decreases, to become zero close to the bottom of the grooves 30 defining the element 100.

FIG. 6 shows another variant of a block 1000 according to the invention in which at least two lateral faces 1300 of said block are covered by a plurality of strips 1310 of covering mix MR the grip characteristic on wet ground of which is greater than that of the base mix MB on the same ground. On each face, the strips are all of the same dimensions and are oriented perpendicular to the contact face 2000. The configuration illustrated corresponds to the state when new and it can clearly be seen that the strips partially cover the contact face 2000. In this case, it is not absolutely necessary to remove, for example by grinding, the strips from the contact face since there is a sufficient amount of base mix on this face in the initial state and after partial wear the covering mix MR on said face is worn off.

FIG. 7 shows a section along a plane VII-VII parallel to the contact surface and at a depth corresponding substantially to half the thickness of the block of FIG. 6. In this section the different strips 1310 of covering mix MR can be seen on the lateral faces 1300. The case illustrated with the support of FIGS. 6 and 7 can easily be modified with an identical technical effect, for example by arranging the strips so that they are inclined by an angle other than zero with a line perpendicular to the contact face, or alternatively by arranging strips of different mixes or in different thicknesses.

FIG. 8 shows a plan view of a tread pattern of a tread according to the invention. This tread pattern comprises three main grooves R1, R2, R3 of circumferential orientation and of substantially identical depths defining ribs N1 and N2 and shoulder parts Ei and Ex. The equatorial plane marked by the direction XX' in FIG. 8 cuts the rib N1 into two parts. The shoulder part Ei is intended to be placed on the inner side of a vehicle and is furthermore provided with transverse grooves Ti defining blocks Bi. The rib N2 located axially between the equatorial plane and the row of blocks Bi is provided with oblique incisions Oi which open only into the groove R3, this groove R3 being located between said rib N2 and said row of blocks Bi. On the other shoulder part Ex intended to be on the outer side of a vehicle, there is formed a notch Ce of longitudinal orientation and of a width less than the circumferential grooves R1, R2, R3 and the transverse grooves Te from this notch axially towards the outside of the shoulder Ex to define blocks Be.

The tread is composed of two different base mixes MBi and MBe, the separation between these mixes occurring radially beneath the groove R1 axially closest to the shoulder part Ex as can be seen in FIG. 9, which shows a cross-section along the line IX-IX of the tread shown in FIG. 8. The two base mixes have different reinforcing fillers: the base mix MBe of the shoulder part Ex (towards the outside of the vehicle) is reinforced by fillers consisting of 50% silica and 50% carbon black. The reinforcing filler of the base mix MBi (forming the ribs N1, N2 and the shoulder Ei) is formed of 90% silica and 10% carbon black.

The faces defining the grooves R1, R2, R3 and those of the transverse grooves Oi and Ti are covered with a covering mix MR having a grip on wet ground greater by 12% than the grip on wet ground of the base mix Mbi (this same covering mix MR has a wet grip greater by 18% than that of the base mix Mbe). The average thickness of covering mix MR is equal to 0.5 mm.

Each composition or base mix of a Tg substantially equal to −26° C. is formed from a mixture of two SSBRs having Tgs of −50° C. and −30° C. respectively; the composition used in the covering mix is formed from an SSBR having a Tg of −18° C.

The covering mix has a glass transition temperature Tg greater by 8° C. than those of the base mixes MB1 and MB2 (the glass transition temperature Tg is measured in accordance with Standard ASTM D 3418-82). The three mixes MB1, MB2 and MR used have the same Shore A hardness equal to 68 at 20° C. (the Shore A hardness is measured in accordance with Standard ASTM D 2240-86). More generally, and in order to retain good performance on wet ground for temperatures of between 20° C. and 0° C., the hardnesses of the mixes in this same temperature zone are preferably less than 90 and, more preferably, between 50 and 90.

Preferably, the difference between the Shore A hardnesses of the base and covering mixes is at most equal to 30 and even more preferably at most equal to 10.

Tests Carried Out with Tires

Reference tires, the tread of which comprises the two base mixes, without the presence of covering mix, were compared with tires according to the invention having in addition to the same base mixes as those of the reference tires a covering mix as described in conjunction with the example shown in FIG. 8; all these tires have the same tread pattern (corresponding to that of FIG. 8). The comparison is performed by a driver who, after several passes, assigns an overall assessment mark during travel on one and the same circuit covered with a depth of water equal on average to 1 mm.

The tires tested are 225/40 ZR 18 tires mounted at the front and rear of a BMW M3; the cold inflation pressures are 2.2 bar at the front and 2.6 bar at the rear.

With tires according to the invention as described previously, a difference of 1 point on average is obtained in their favor relative to the assessment mark, which is drawn up on a scale of 1 to 10.

In a wear test, the tire according to the invention shows no degradation of wear compared with the reference tire.

The industrial production of a tread according to the invention may consist of laying, on the non-vulcanized tire blank provided with a tread of non-vulcanized base mix, strips of a mix different from the base mix, as described in patent specification EP 0510550 (the strips may be laid in the circumferential and/or transverse direction on the tread). Another way may consist of producing the tread by co-extruding two mixes (or more) at the time of extrusion of the tread.

If in the invention, an essential element is the presence of mix having a high grip on wet ground on at least one face of the elements in relief, it is sensible to include in this invention tread patterns some of the contact surfaces with the ground of which, when new, are also covered partially or entirely with a covering mix of the same nature. An example has already been illustrated and described in FIG. 6. Two other variants are given by way of examples in FIGS. 10 and 11.

Figure 10:
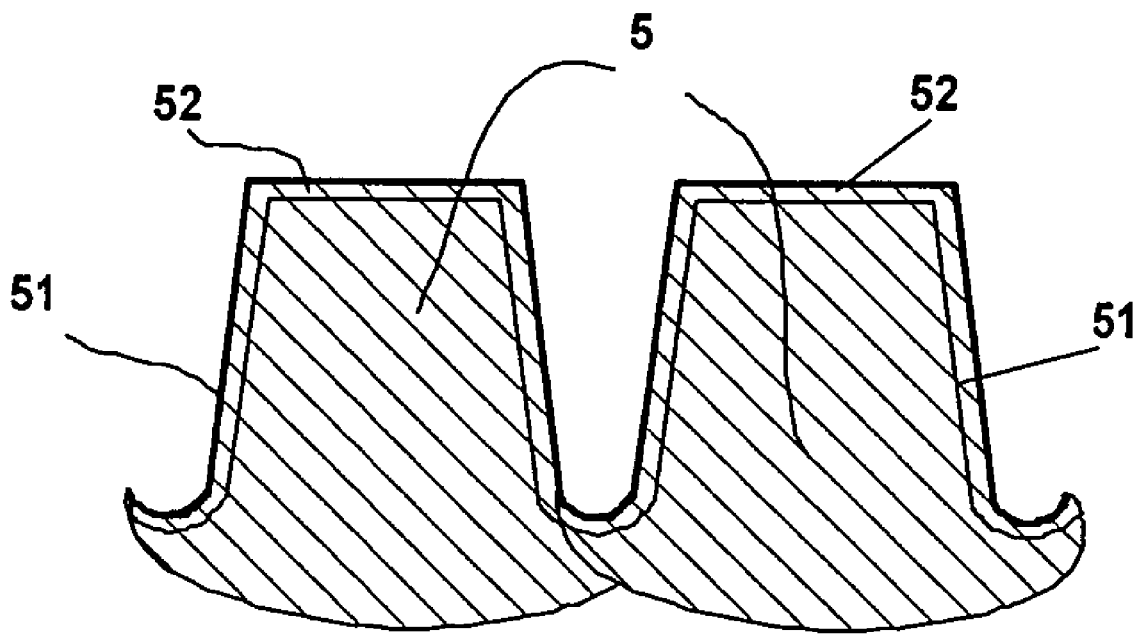
FIG. 10 shows a variant embodiment of a tread pattern element according to the invention.

FIG. 10 shows a section through an element in relief 5 of a tread according to the invention: in this example, the thickness of covering mix present on the lateral faces 51 of the element 5 is extended over the entire contact surface 52 of said element. In this configuration, the tire, when new, has excellent performance on wet ground but wear will rapidly lead to the major part of the layer of covering mix on the contact surface being eliminated, thus placing the base mix in contact with the roadway to make it possible to reduce the rate of wear while maintaining good grip performance on wet ground by the presence of covering mix on the faces of the element in relief.

Figure 11:
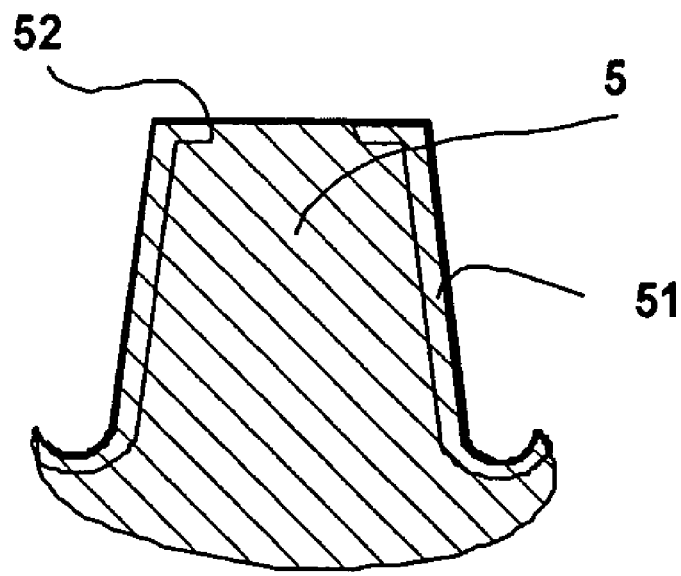
FIG. 11 shows another variant embodiment of a tread pattern element according to the invention.

In FIG. 11, the covering mix present on the lateral faces 51 of an element 5 is extended partially over the contact surface 52 of said element.

The invention is not limited to the examples described and shown, and various modifications can be made thereto without departing from the scope thereof. In particular, in the case of a tire intended initially for winter-type use and after partial wear for all-weather travel, it is known to use two base mixes of different characteristics (see for example U.S. Pat. No. 4,619,300); implementing the invention for this type of tire makes it possible to improve still further the grip performance while retaining good wear performance. For this, a tread may be formed having for a first portion of wear (winter use with the new tire) a first base mix specific to winter running, this first base mix being covered on the faces of the motifs in relief with a covering mix of better grip on wet ground than that of said first mix as proposed previously. Beneath this first base mix there is laid a second base mix specific to all-weather running. This second base mix is located to the inside of the tread relative to the running surface when new, so as to appear after appropriate wear (for example from half-wear of the tread onwards). The motifs in relief [which] may or may not be extended in this second base mix and may or may not be coated over all or parts of their lateral walls by a covering mix. The grip characteristic on wet ground of the covering mix is greater than the grip characteristic on wet ground of the all-weather base mix.

What is claimed is:

1. A tread band for a tire of a vehicle comprising a plurality of grooves of circumferential orientation defining tread pattern elements comprising, in addition to a contact face intended to come into contact with the roadway during travel, at least two lateral faces, this tread comprising, in the axial direction, at least two different base mixes opening on to the contact faces of the tread pattern elements when the tread is new, one base mix having a grip on wet ground which is greater than the grip of the other base mix, and wherein a plurality of the lateral faces of circumferential general orientation are covered at least in part with a covering mix extending from the contact face over at least 30% of the height of the lateral faces and over a thickness at most equal to 30% of the average distance between the lateral faces of circumferential general orientation of said element, wherein the covering mix of the tread pattern elements on one part of the running surface is different from the covering mix of the tread pattern elements of the other part of the running surface, the covering mix located axially towards the inside of the vehicle having a wet grip greater than that of the covering mix of the other part located axially towards the inside of the vehicle, and wherein each covering mix comprising a reinforcing inorganic filler having a grip on wet ground which is higher than the grip of each of the base mixes on the same ground.

2. The tread band for a tire according to claim 1 wherein the reinforcing inorganic filler of the covering mix of the tread pattern elements comprises a highly dispersible silica.

3. The tread band for a tire according to claim 2 wherein the separation between the base mixes occurs radially beneath a circumferential groove.

4. The tread band for a tire according to claim 2 wherein one base mix is reinforced by fillers consisting of 50% silica and 50% carbon black, and wherein the reinforcing filler of the other base mix is formed of 90% silica and 10% carbon black.

5. The tread band for a tire according to claim 2 wherein a base mix has a wet grip greater by 18% than the grip of the other base mix and wherein the grip of the covering mix on a wet ground is greater by 12% than the grip on a wet ground of the base mix having the higher grip among the base mixes.

6. The tread band for a tire according to claim 5 wherein the difference between the Shore A hardnesses of the base and covering mixes is at most equal to 10.

7. The tread band for a tire according to claim 2 wherein the covering mix of at least one lateral face is under the form of a plurality of strips, at least some of them covering the contact face of the sculpture elements when new.

8. The tread band for a tire according to claim 2 wherein the loss factors of the base mixes are greater than 0.23 when measured at a temperature equal to 23° C. and under a peak-to-peak shearing deformation of 2%.

9. The tread band for a tire according to claim 2 wherein the covering mix contains no carbon black.

* * * * *